(12) United States Patent
Obata et al.

(10) Patent No.: US 10,326,842 B2
(45) Date of Patent: Jun. 18, 2019

(54) TERMINAL CONNECTION DEVICE, PROCESSING INFORMATION EXECUTION SYSTEM, PROCESSING INFORMATION EXECUTION METHOD

(71) Applicant: CLARION CO., LTD., Saitama-shi, Saitama (JP)

(72) Inventors: Shinichi Obata, Tokyo (JP); Takashi Matsumoto, Tokyo (JP); Yasushi Nagai, Saitama (JP); Susumu Kojima, Saitama (JP)

(73) Assignee: CLARION CO., LTD., Saitama (JP)

( * ) Notice: Subject to any disclaimer, the term of this patent is extended or adjusted under 35 U.S.C. 154(b) by 317 days.

(21) Appl. No.: 15/122,741

(22) PCT Filed: Jun. 9, 2015

(86) PCT No.: PCT/JP2015/066564
§ 371 (c)(1),
(2) Date: Aug. 31, 2016

(87) PCT Pub. No.: WO2015/190460
PCT Pub. Date: Dec. 17, 2015

(65) Prior Publication Data
US 2017/0078403 A1    Mar. 16, 2017

(30) Foreign Application Priority Data

Jun. 13, 2014  (JP) .................................. 2014-122185

(51) Int. Cl.
G06F 15/16        (2006.01)
H04L 29/08        (2006.01)
G06F 16/951       (2019.01)

(52) U.S. Cl.
CPC .......... *H04L 67/141* (2013.01); *G06F 16/951* (2019.01); *H04L 67/1031* (2013.01); *H04L 67/125* (2013.01)

(58) Field of Classification Search
USPC ....... 709/240, 203, 206, 217, 219, 223, 224, 709/226, 228, 230, 232, 238; 370/389;
(Continued)

(56) References Cited

U.S. PATENT DOCUMENTS 7,672,303 B1 *  3/2010  Baxter, III ............ H04L 49/205
                                                    370/389
7,853,716 B1 * 12/2010  Baxter, III ............ H04L 49/205
                                                    709/240

(Continued)

FOREIGN PATENT DOCUMENTS

CN      101286114 A     10/2008
CN      102930889 A      2/2013
(Continued)

OTHER PUBLICATIONS

Extended European Search Report dated Mar. 15, 2018 for the European Application No. 15805820.6.

(Continued)

*Primary Examiner* — Quang N Nguyen
(74) *Attorney, Agent, or Firm* — Volpe and Koenig, P.C.

(57) ABSTRACT

A terminal connection device includes: a storage unit configured to store a priority based on a type of processing information for performing input or output of information; a communication unit configured to receive from another device a processing request in which the processing information is identified; and an input and output path assignment unit configured to acquire, when the communication unit has received the processing request, the type of the processing information identified in the processing request, to identify, (Continued)

by using an external processing information priority, which is a priority based on the type, and candidates of usable input and output paths for each piece of the processing information, the input and output path for executing the processing information relating to the processing request, and to assign the processing information to the identified input and output path.

12 Claims, 17 Drawing Sheets

(58) Field of Classification Search
USPC ............................... 455/344; 710/40; 701/36
See application file for complete search history.

(56) References Cited

U.S. PATENT DOCUMENTS

| 2007/0079020 A1* | 4/2007 | Chinya | G06F 9/4812 |
| | | | 710/40 |
| 2009/0029670 A1* | 1/2009 | Cho, II | G01C 21/00 |
| | | | 455/344 |
| 2013/0238190 A1* | 9/2013 | Yasuda | G01C 21/36 |
| | | | 701/36 |
| 2014/0038669 A1 | 2/2014 | Shimizu et al. | |

FOREIGN PATENT DOCUMENTS

| JP | 10-258688 A | 9/1998 |
| JP | 11-015494 A | 1/1999 |
| JP | 2000-138999 A | 5/2000 |
| JP | 2001-116581 A | 4/2001 |
| JP | 2004-320582 A | 11/2004 |
| JP | 2006-267328 A | 10/2006 |
| JP | 2010-034755 A | 2/2010 |
| JP | 2013-102376 A | 5/2013 |
| JP | 2013-171514 A | 9/2013 |

OTHER PUBLICATIONS

Chinese Office Action dated Jun. 5, 2018 for the Chinese Patent Application No. 201580007348.6.

* cited by examiner

FIG. 2

INPUT AND OUTPUT CONTROL SETTING DB 121A

| APPLICATION TYPE | CONTROL METHOD | INTERRUPTIBILITY | PRIORITY |
|---|---|---|---|
| EXTERNAL DEVICE (VOICE RECOGNITION) | SILENT INTERRUPT | NOT INTERRUPTIBLE | 1 |
| VOICE RECOGNITION | SILENT INTERRUPT | NOT INTERRUPTIBLE | 2 |
| NAVIGATION DEVICE | MIX INTERRUPT | NOT INTERRUPTIBLE | 4 |
| EXTERNAL DEVICE (MUSIC) | CONSTANT | INTERRUPTIBLE | 5 |
| MUSIC | CONSTANT | INTERRUPTIBLE | 6 |
| GENERAL | MIX INTERRUPT | INTERRUPTIBLE | 8 |
| EXTERNAL DEVICE (DEFAULT) | MIX INTERRUPT | INTERRUPTIBLE | 9 |
| ⋮ | ⋮ | ⋮ | ⋮ |

Columns: 121Aa, 121Ab, 121Ac, 121Ad

FIG. 3

APPLICATION TYPE PRIORITY MANAGEMENT DB 122A

122Ab  122Aa

| PRIORITY | APPLICATION TYPE |
|---|---|
| 1 | EXTERNAL DEVICE (VOICE RECOGNITION) |
| 2 | VOICE RECOGNITION |
| 4 | NAVIGATION DEVICE |
| 6 | MUSIC |
| 8 | GENERAL |

(A)

122Ab  122Aa

| PRIORITY | APPLICATION TYPE |
|---|---|
| 2 | VOICE RECOGNITION |
| 4 | NAVIGATION DEVICE |
| 5 | EXTERNAL DEVICE (MUSIC) |
| 6 | MUSIC |
| 8 | GENERAL |

(B)

122Ab  122Aa

| PRIORITY | APPLICATION TYPE |
|---|---|
| 2 | VOICE RECOGNITION |
| 4 | NAVIGATION DEVICE |
| 6 | MUSIC |
| 8 | GENERAL |
| 9 | EXTERNAL DEVICE (DEFAULT) |

INPUT AND OUTPUT PATH SHAREABILITY SETTING DB 123A

| INPUT AND OUTPUT PATH | SHAREABILITY |
|---|---|
| SPKR_1 | SHAREABLE |
| SPKR_2 | SHAREABLE |
| SPKR_3 | SHAREABLE |
| PHONE | NOT SHAREABLE |
| MIC-FRONT | NOT SHAREABLE |
| SPKR-SUR | SHAREABLE |

123Aa — INPUT AND OUTPUT PATH column
123Ab — SHAREABILITY column

INPUT AND OUTPUT PATH USAGE MANAGEMENT DB 124A

| INPUT AND OUTPUT PATH | USABILITY | APPLICATION ID | APPLICATION TYPE |
|---|---|---|---|
| SPKR_1 | USABLE | 0000 | EXTERNAL DEVICE (MUSIC) |
| SPKR_2 | USABLE | 0001 | NAVIGATION DEVICE |
| SPKR_3 | NOT USABLE | — | — |
| PHONE | USABLE | — | — |
| MIC-FRONT | USABLE | — | — |
| SPKR-SUR | USABLE | 0002 | GENERAL |

FIG. 10
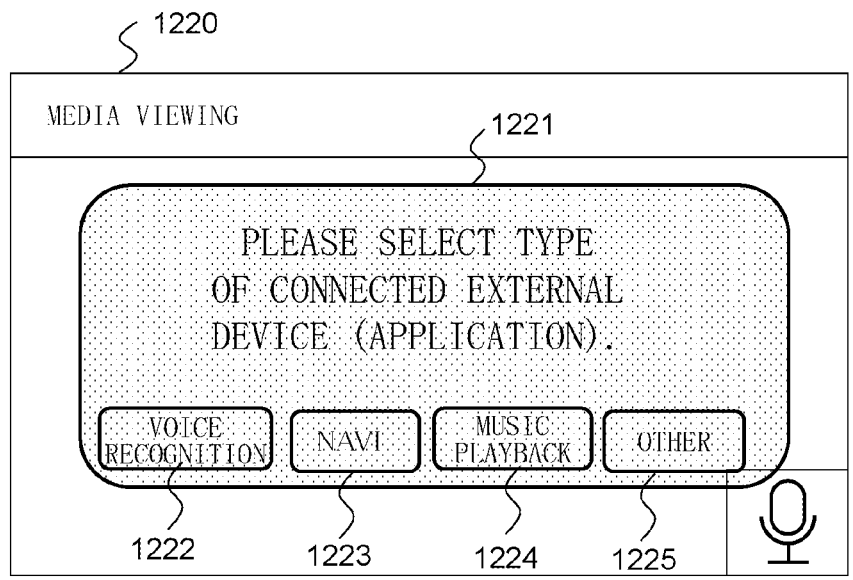
(A)
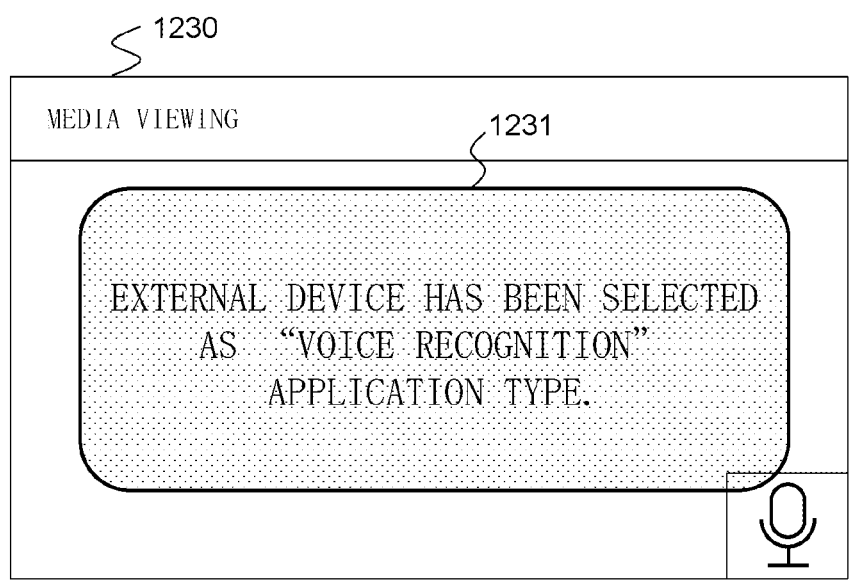
(B)

FIG. 11

| APPLICATION TYPE | INPUT AND OUTPUT PATH |
|---|---|
| EXTERNAL DEVICE (VOICE RECOGNITION) | MIC-FRONT |
| VOICE RECOGNITION | MIC-FRONT |
| NAVIGATION DEVICE | SPKR_1 |
| EXTERNAL DEVICE (MUSIC) | SPKR_1 |
| ⋮ | ⋮ |

FIG. 13

| APPLICATION TYPE | FIRST INPUT AND OUTPUT PATH | SECOND INPUT AND OUTPUT PATH | THIRD INPUT AND OUTPUT PATH |
|---|---|---|---|
| EXTERNAL DEVICE (VOICE RECOGNITION) | MIC-FRONT | — | — |
| VOICE RECOGNITION | MIC-FRONT | — | — |
| NAVIGATION DEVICE | SPKR_1 | SPKR_2 | SPKR_3 |
| EXTERNAL DEVICE (MUSIC) | SPKR_1 | SPKR_2 | SPKR_3 |
| ⋮ | ⋮ | ⋮ | ⋮ |

TERMINAL CONNECTION DEVICE, PROCESSING INFORMATION EXECUTION SYSTEM, PROCESSING INFORMATION EXECUTION METHOD

TECHNICAL FIELD

The present invention relates to a terminal connection device, a processing information execution system, and a processing information execution method. The present invention claims priority from Japanese Patent Application No. 2014-122185, filed on Jun. 13, 2014, the entire contents of which are hereby incorporated by reference for the designated countries allowing incorporation by reference of literature.

BACKGROUND ART

Hitherto, there has been disclosed a technology relating to an in-vehicle device in which, when a line image of a guidance route in a navigation image interrupted from a mobile terminal side indicates a bend in a predetermined angle range with respect to the straight-ahead direction when an image based on an in-vehicle device side application is displayed, continuous display requirement determination means determines that a continuous interruption display of the navigation image is required, and based on control performed on display switching means by display switching control means, the navigation image is displayed in a continuously interrupted manner even after a voice guidance interruption from the mobile terminal side has finished.

CITATION LIST

Patent Literature

[PTL 1] Japanese Patent Laid-open Publication No. 2013-102376

SUMMARY OF INVENTION

Technical Problem

A terminal connection device of an in-vehicle device or other devices is configured to perform, when executing software held in the terminal connection device, input processing or output processing by using a predetermined input and output path. Further, when a terminal device connected to the terminal connection device executes software, an input and output path of the terminal connection device may be used. In this case, because a uniquely-specified input and output path is used by the terminal connection device, for example, a conflict may be produced with the input and output path being used for software being executed by the terminal connection device, which can cause a problem to occur, e.g., the software being executed to be forcibly closed.

In the technology disclosed in Patent Literature 1, an image is displayed by using a uniquely-specified output path for an application to be transmitted from a mobile terminal side, but processing information e.g. software is not assigned to an appropriate input and output path based on the processing information.

The present invention has been made in view of the above-mentioned points. It is an object of the present invention to provide a technology capable of assigning processing information to an appropriate input and output path.

Solution to Problem

The present application includes a plurality of measures for solving the above-mentioned problem, an example of which is given as follows.

In order to solve the above-mentioned problem, according to one embodiment of the present invention, there is provided a terminal connection device, including: a storage unit configured to store a priority based on a type of processing information for performing input or output of information; a communication unit configured to receive from another device a processing request in which the processing information is identified; and an input and output path assignment unit configured to acquire, when the communication unit has received the processing request, the type of the processing information identified in the processing request, to identify, by using an external processing information priority, which is a priority based on the type, and a candidate of an usable input and output path for each piece of the processing information, the input and output path for executing the processing information relating to the processing request, and to assign the processing information to the identified input and output path.

Advantageous Effects of Invention

According to the present invention, it is possible to provide the technology capable of assigning processing information to an appropriate input and output path.

Objects, configurations, and effects other than those described above become apparent by the following description of an embodiment of the present invention.

BRIEF DESCRIPTION OF DRAWINGS

FIG. 2 is a table for showing an example of an input and output control setting DB.

FIG. 3 are tables for showing examples of an application type priority management DB.

FIG. 4 is a table for showing an example of an input and output path shareability setting DB.

FIG. 10 are views for illustrating an example of an application type input screen and an example of an application type confirmation screen.

FIG. 11 is a table for showing an outline of path information.

FIG. 13 is a table for showing an example of path information according to the first modified example.

DESCRIPTION OF EMBODIMENTS

Figure 1:
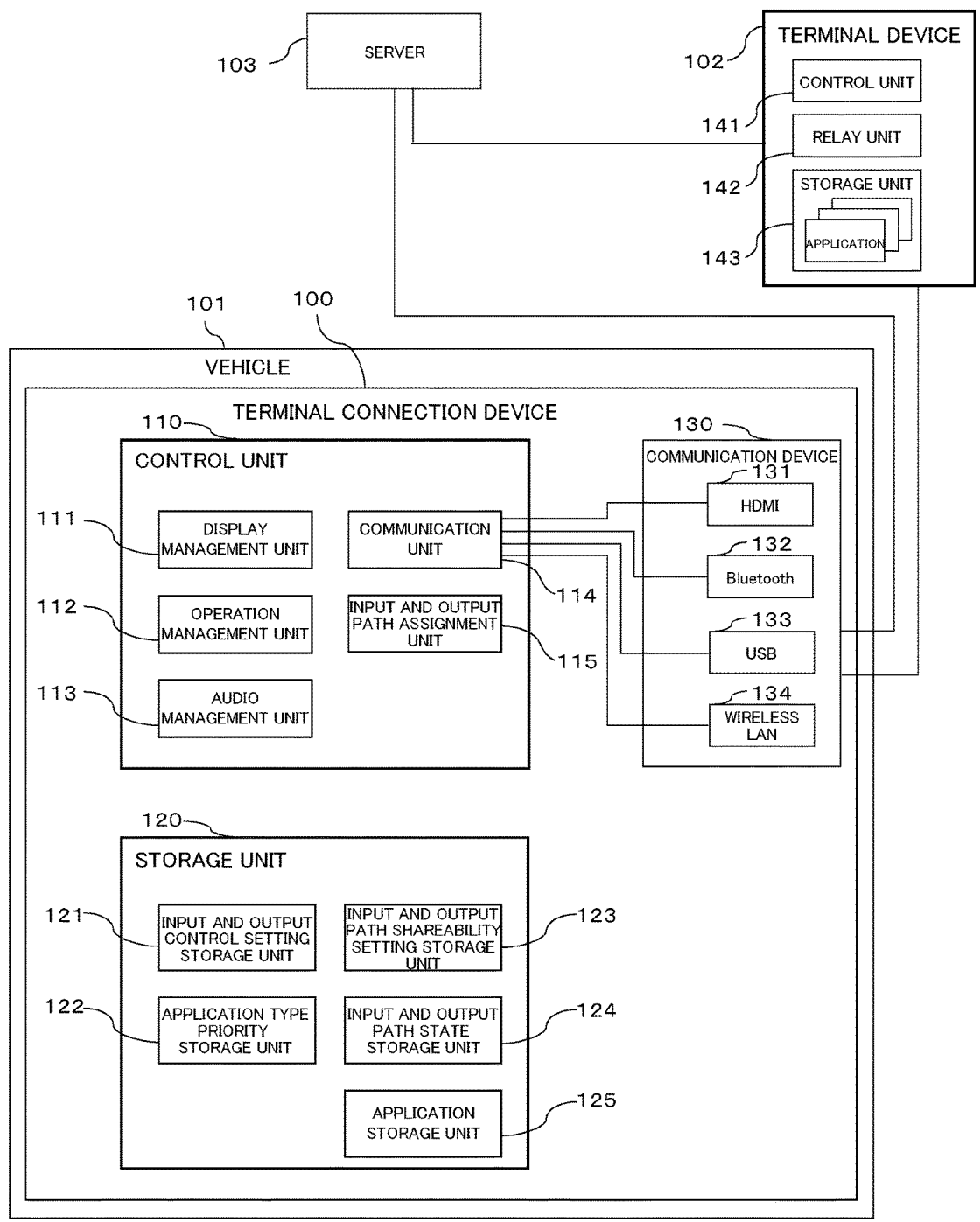
FIG. 1 is an example of a function block diagram of a processing information execution system.

Now, a description is made of examples of an embodiment of the present invention with reference to the accompanying drawings. FIG. 1 is an example of a function block diagram of a processing information execution system 10. A description is now made of an example of a case in which a terminal connection device according to this embodiment is used as an in-vehicle device.

The processing information execution system 10 includes a terminal connection device 100, a terminal device 102, and a server 103. The terminal connection device 100 is a so-called in-vehicle device mounted in a vehicle 101. The terminal connection device 100 may be, for example, an electronic device such as a personal computer (PC), a personal digital assistant (PDA), or a smartphone. The terminal device 102 is an electronic device such as a PC or a smartphone. The server 103 is, for example, a server computer. The server 103 is configured to transmit to or receive from the terminal device 102 and the terminal connection device 100 data including processing information. In the processing information execution system 10 according to this embodiment, the server 103 and the vehicle 101 are not essential components.

In the processing information execution system 10 according to this embodiment, the processing information held by the terminal connection device 100 is executed by using an input and output path of the terminal connection device 100, and further, the processing information held by the terminal device 102 is executed by using the input and output path of the terminal connection device 100. In the following description, the processing information is referred to as an application.

The input and output path is a path for inputting and outputting information, such as audio and video. the input and output path is used for each input device or output device, such as a microphone or a speaker.

The terminal connection device 100 includes a control unit 110, a storage unit 120, and a communication device 130. The control unit 110 is configured to control processing for assigning an appropriate application to the input and output paths. The storage unit 120 is configured to store information required for the processing by the control unit 110. The communication device 130 is configured to act as an interface for communication to and from external devices, such as the server 103 and the terminal device 102.

The control unit 110 includes a display management unit 111, an operation management unit 112, an audio management unit 113, a communication unit 114, and an input and output path assignment unit 115.

The display management unit 111 is configured to cause a display device included in the terminal connection device 100 to display a display screen. The display management unit 111 is configured to cause the display device to display a display screen, such as an application type input screen, an application type confirmation screen, or an application type change screen. Those display screens are described later.

The operation management unit 112 is configured to receive an operation based on input and the like via an operation device. The audio management unit 113 is configured to input and output audio information with the use of a speaker or a microphone. The audio management unit 113 is configured to control execution of inputs and outputs by applications for inputting and outputting audio. The communication unit 114 is configured to transmit and receive information to and from an external device by using the communication device 130.

The input and output path assignment unit 115 is configured to assign applications to the input and output path based on an input and output path shareability setting database (DB) relating to shareability of the input and output paths, an input and output path usage management DB relating to usage of the input and output paths, and the like. The details of the assignment are described later.

The storage unit 120 includes an input and output control setting storage unit 121, an application type priority storage unit 122, an input and output path shareability setting storage unit 123, an input and output path state storage unit 124, and an application storage unit 125.

The input and output control setting storage unit 121 is configured to store an input and output control setting DB 121A in which control methods and priorities are associated with application types, which are the types of the applications. The application type priority storage unit 122 is configured to store an application type priority management DB 122A for managing the application types and the priorities of the applications that are running. The input and output path shareability setting storage unit 123 is configured to store an input and output path shareability setting DB 123A indicating whether or not the input and output paths of the terminal connection device 100 are shareable. The input and output path state storage unit 124 is configured to store an input and output path usage management DB 124A indicating usage of the input and output paths. Each of those databases is described later. The application storage unit 125 is configured to store applications.

The communication device 130 includes, as interfaces to be used for communication, High-Definition Multimedia Interface (HDMI (trademark)) 131, Bluetooth (trademark) 132, universal serial bus (USB) 133, and wireless local area network (LAN) 134. The communication interfaces included in the communication device 130 are not limited to those examples. Further, the communication device 130 may not include all of the interfaces described above as examples.

The terminal device 102 includes a control unit 141, a relay unit 142, and a storage unit 143. The control unit 141 is configured to execute the applications using the input and output paths of the terminal connection device 100. The relay unit 142 is configured to perform communication to and from another device, including the terminal connection device 100. The relay unit 142 is configured to output to the terminal connection device 100 a processing request in which an application has been identified. The storage unit 143 is configured to store, in addition to the information required for the processing by the control unit 141, the applications to be executed by the terminal device 102.

In this embodiment, when the communication unit 114 of the terminal connection device 100 receives an application processing request transmitted by the relay unit 142 of the terminal device 102, the application type input screen is displayed by the display management unit 111, and input of the type of application by the user is received. The input and output path assignment unit 115 is configured to refer to the storage unit 120 by using the input type, to identify an input and output path by using the priority associated with the relevant type and information on the input and output path based on the relevant type, and to assign to the identified input and output path the application relating to the processing request. As a result, an input and output path based on the type of the application can be used for execution of the application.

Next, the various types of information stored in the storage unit 120 are described.

FIG. 2 is a table for showing an example of the input and output control setting DB 121A. The input and output control setting DB 121A includes, for each application type 121Aa, a control method 121Ab, an interruptibility 121Ac, and a priority 121Ad.

The application type 121Aa is information for identifying the types into which the applications are to be classified. Examples of the application type include "external device (voice recognition)", "voice recognition", "navigation device", and "external device (music)". In FIG. 2, the application type 121Aa having the character string "external device" indicates an application to be executed by the terminal device 102. The other application types 121Aa indicate applications to be executed by the terminal connection device 100.

The control method 121Ab is information for identifying a processing control method to be performed when a processing request for another application has been received during execution of the application. Examples of the control method 121Ab include "silent interrupt", "MIX interrupt", and "constant".

The entry "silent interrupt" is a control method in which the application of the type identified by the application type 121Aa is executed, but processing of other applications is halted. When the processing of the application being executed has finished, the processing of the other applications is restarted. The processing of the other applications may also be finished in conjunction with execution of the application relating to the application type 121Aa.

The entry "MIX interrupt" is a control method in which processing of the application of the type relating to the application type 121Aa and processing of the other applications are performed in parallel. For example, when an application that involves audio output is "MIX interrupted" during execution of an application that involves another instance of audio output, the audio outputs by the two applications are superimposed.

The entry "constant" is a control method in which processing of the application of the type relating to the application type 121Aa is executed, but processing of other applications is finished.

The interruptibility 121Ac is information for identifying whether or not processing of another application is executable while the application of the type relating to the application type 121Aa is being executed.

The priority 121Ad is information for determining whether or not the application of the type identified by the application type 121Aa is preferentially executable over other application types. For example, applications having a lower priority value are determined as having a higher priority. The input and output paths are preferentially assigned to application types having a higher priority. Further, a control method 121Ab relating to an application type 121Aa having a high priority is preferentially employed over a control method 121Ab relating to another application type 121Aa.

FIG. 3 are tables for showing examples of the application type priority management DB 122A. The application type priority management DB 122A includes an application type 122Aa and a priority 122Ab. The application type 122Aa is information for identifying an application classification. The application type 122Aa is the same as the application type 121Aa of the input and output control setting DB 121A. The application type 122Aa is the type of the applications that are running at the current time. The priority 122Ab, which is the priority of the application type 122Aa, is the same as the priority 121Ad of the input and output control setting DB 121A.

In the example of the application type priority management DB 122A shown in FIG. 3(A), because "external device (voice recognition)", "voice recognition", "navigation device", "music", and "general" are included as the application type 122Aa, it can be seen that the applications of the relevant types are currently running. Similarly, referring to the example of the application type priority management DB 122A shown in FIG. 3(B), it can be seen that the applications of the types "voice recognition", "navigation device", "external device", "music", and "general" are currently running. Further, referring to the example of the application type priority management DB 122A shown in FIG. 3(C), it can be seen that the applications of the types "voice recognition", "navigation device", "music", "general", and "external device (default)" are currently running.

FIG. 4 is a table for showing an example of the input and output path shareability setting DB 123A. The input and output path shareability setting DB 123A includes an input and output path 123Aa and a shareability 123Ab.

The input and output path 123Aa is information for identifying an input and output path of the terminal connection device 100. Examples of the input and output path 123Aa include "SPKR_1", "SPKR_2", "SPKR_3", "PHONE", "MIC-FRONT", and "SPKR-SUR".

The entries "SPKR_1", "SPKR_2", and "SPKR_3" are all classified as output paths that use a speaker. The entry "PHONE" indicates an output path that uses a headphone jack. The entry "MIC-FRONT" indicates an input path that uses a microphone. The entry "SPKR-SUR" indicates an output path that uses a surround speaker. In the following description, the term "speaker" is used in the sense of a speaker that is not a surround speaker. The input and output paths are not limited to the examples described above.

The shareability 123Ab is information for identifying whether or not the input and output path 123Aa is capable of being shared by a plurality of applications.

In the shareability 123Ab, "not shareable" is associated with "MIC-FRONT" of the input and output path 123Aa. This is because different settings may be desired depending on the operating application. For example, as the application, when the relevant input and output path is to be used for active noise reduction (reduction of a specific noise) that utilizes a speaker array in the vehicle, the path is adjusted so that a wide-angle sound collecting characteristic is obtained, whereas when the relevant input and output path is to be used for voice recognition, the path needs to be adjusted so that a sound collecting characteristic having a narrow directionality is obtained.

Further, the reason why "not shareable" is associated with the shareability 123Ab for "PHONE" of the input and output path 123Aa is to prevent the occurrence of a strange feeling from a plurality of sound sources that may occur if "PHONE" is used as an output path for a backseat earphone.

Figure 5:
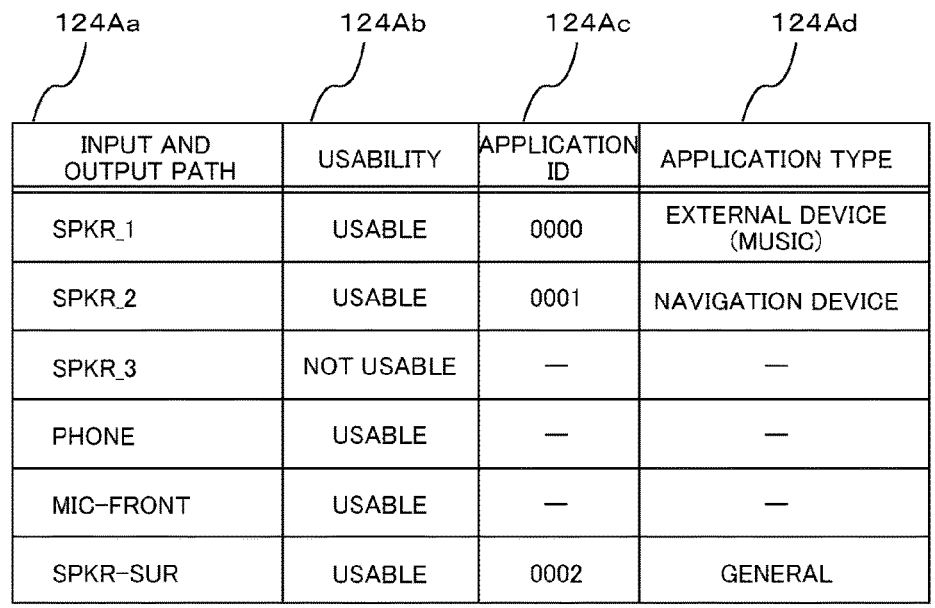
FIG. 5 is a table for showing an example of an input and output path usage management DB.

FIG. 5 is a table for showing an example of the input and output path usage management DB 124A. The input and output path usage management DB 124A includes an input and output path 124Aa, a usability 124Ab, an application identification (ID) 124Ac, and an application type 124Ad.

The input and output path 124Aa, which is information for identifying an input and output path, is the same as the input and output path 123Aa of the input and output path shareability setting DB 123A. The usability 124Ab is information for identifying whether or not the input and output path is usable. For example, when a physical problem has occurred in an input and output path, information for identifying the fact that the input and output path is not usable is stored in the usability 124Ab.

The application ID 124Ac is identification information for identifying the application being executed when an application is being executed by using the input and output path 124Aa. The application type 124Ad is information for identifying the type of application using the input and output path. When an application is not being executed, nothing is stored in the application ID 124Ac or the application type 124Ad.

The input and output path usage management DB 124A shown in FIG. 5 includes, as the application type 124Ad of the applications being executed, "external device (music)", "navigation device", and "general". This indicates that the applications relating to those types are being executed at the current time. Referring to the input and output control setting DB 121A shown in FIG. 2, because the "navigation device" application type 121Aa has the highest priority, "MIX interrupt", which is the control method 121Ab relating to the relevant application type 121Aa, is being used as the control method. In other words, outputs based on the application types "external device (music)", "navigation device", and "general" are superimposed.

Figure 6:
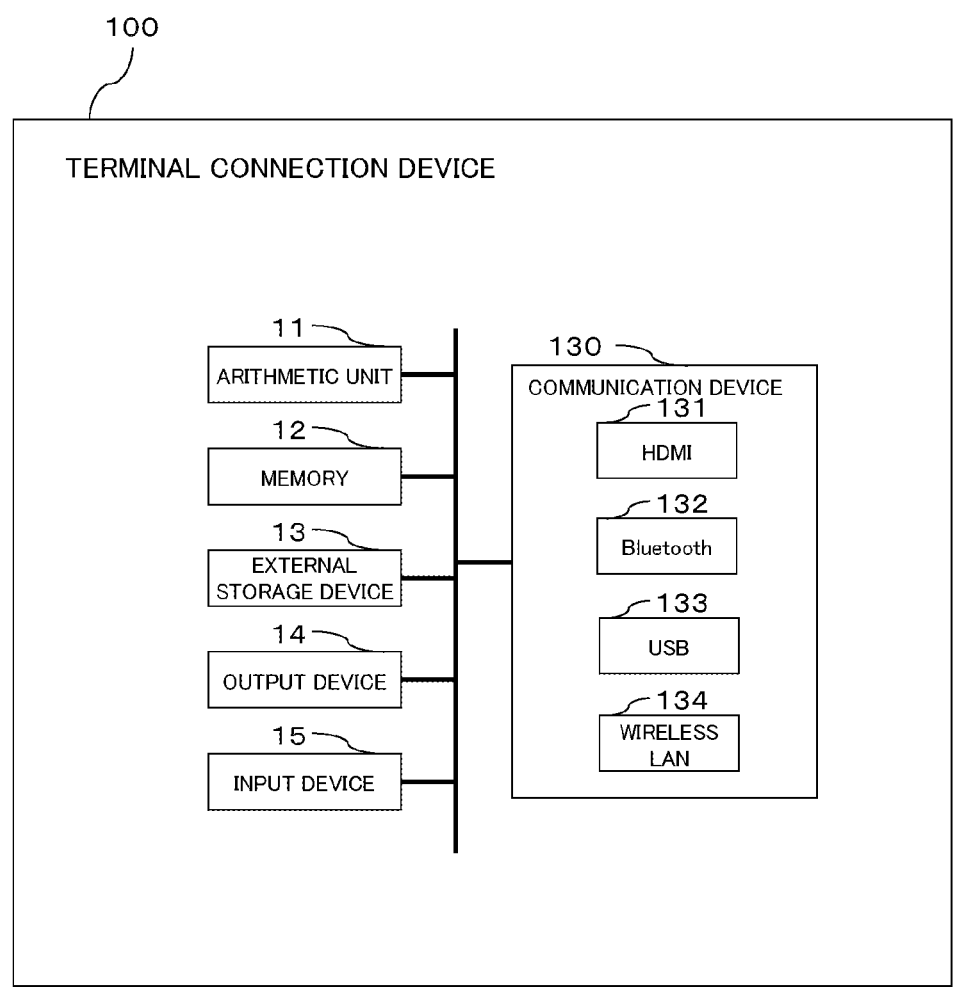
FIG. 6 is a diagram for illustrating a hardware configuration example of a terminal connection device.

FIG. 6 is a diagram for illustrating a hardware configuration example of the terminal connection device 100. The terminal connection device 100 includes an arithmetic device 11, a memory 12, an external storage device 13, an output device 14, an input device 15, and the communication device 130, and the respective components are connected to one another through a bus.

The arithmetic device 11 is a central processing unit (CPU), and is configured to execute processing in accordance with a program recorded in the memory 12 or the external storage device 13. Each processing unit that forms the control unit 110 implements each function by the arithmetic device 11 executing the program.

The memory 12 is a storage device such as a random access memory (RAM) or a flash memory, and is configured to function as a storage area into which the program and data are temporarily read. The external storage device 13 is, for example, a storage medium that is writable and readable such as a hard disk drive (HDD).

The output device 14 is a device configured to perform output processing based on execution of an application. The output device 14 is, for example, a display device such as a liquid crystal display (LCD). The output device 14 includes a speaker, a surround speaker, and a headphone jack. The input device 15, which is a device configured to receive an input operation from the user, is a touch panel, a keyboard, a mouse, or a microphone, for example. The communication device 130 is configured as described above. In addition, the terminal connection device 100 may also include a storage medium drive device (not shown), which is a device configured to input and output information to and from a portable medium, such as a compact disc (CD) or a digital versatile disc (DVD).

The function of the storage unit 120 is implemented by the memory 12 or the external storage device 13. Further, the function of the storage unit 120 may be implemented by a storage device on the network.

The processing of each component of the terminal connection device 100 may be executed by one piece of hardware or may be executed by a plurality of pieces of hardware. Further, the processing of each component of the terminal connection device 100 may be implemented by one program or may be implemented by a plurality of programs.

The terminal device 102 has the same hardware configuration as the terminal connection device 100, and hence a description of the hardware configuration of the terminal device 102 is omitted.

Next, operation of the input and output path assignment processing executed by the processing information execution system 10 is described.

Figure 7:
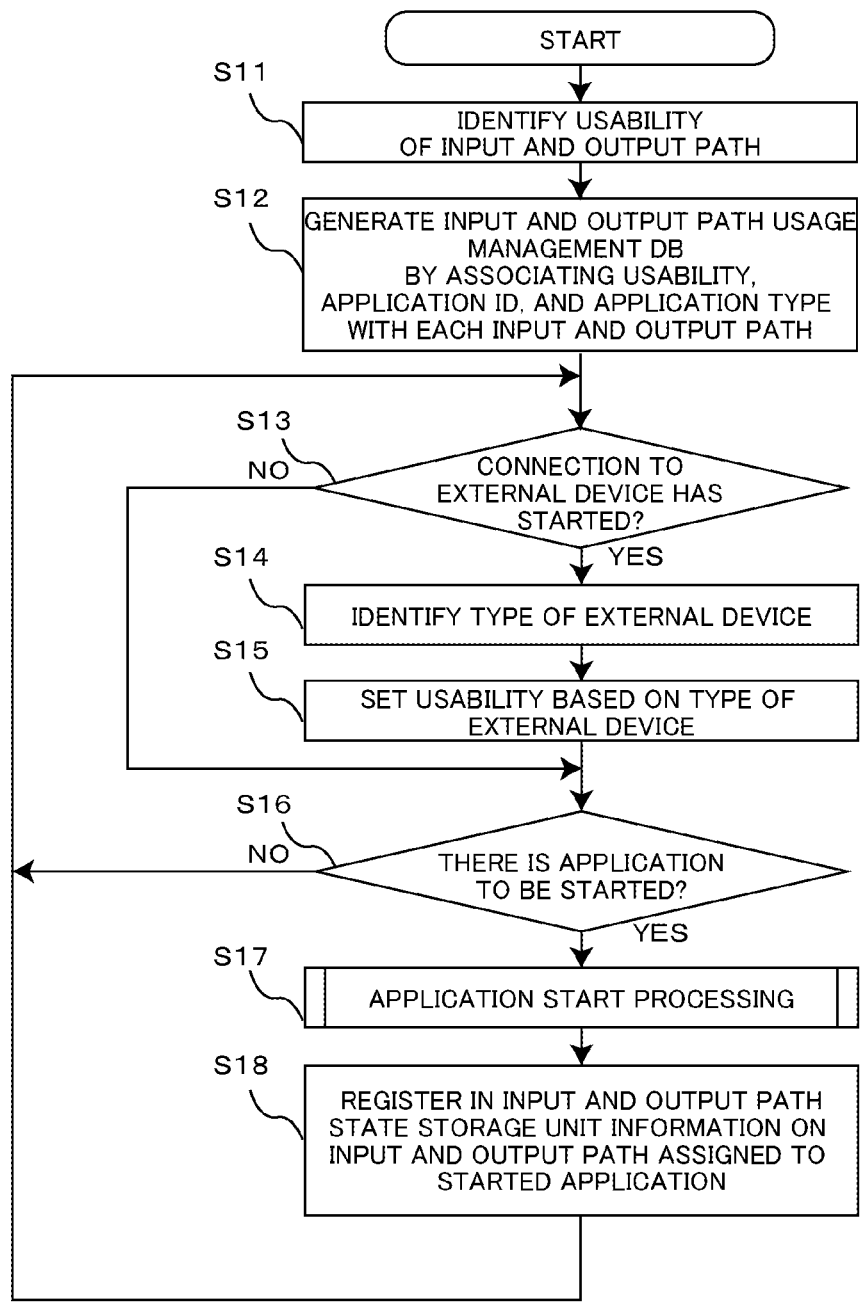
FIG. 7 is a flowchart for illustrating a flow of input and output path assignment processing.

FIG. 7 is a flowchart for illustrating a flow of input and output path assignment processing. This processing is started when the terminal connection device 100 starts up.

First, the input and output path assignment unit 115 identifies the usability of the input and output paths (Step S11). Specifically, the input and output path assignment unit 115 searches for an event, such as a physical problem occurring in the input and output path. The input and output path assignment unit 115 identifies input and output paths for which a problem has been detected as being unusable, and identifies other input and output paths as being usable.

Next, the input and output path assignment unit 115 generates the input and output path usage management DB 124A by associating, for each input and output path, the usability, an application ID, and the application type with one another (Step S12). The application IDs and the application types of the applications being executed are associated with an input and output path when the application processing request is made, for example, and stored in advance in an area (not shown) of the storage unit. The input and output path assignment unit 115 identifies, for each input and output path stored in the input and output path shareability setting DB 123A, the usability identified in Step S11, the application ID identifying the application using the relevant input and output path, and the application type. The input and output path assignment unit 115 generates the input and output path usage management DB 124A by using the identified information.

Next, the communication unit 114 determines whether or not a connection to an external device has started (Step S13). The communication unit 114 detects connections to external devices. The communication unit 114 determines that a connection has started when an external device is connected to any one of the interfaces of the communication device 130.

When the communication unit 114 does not determine that a connection to an external device has started ("NO" in Step S13), the communication unit 114 advances the processing to Step S16.

When the communication unit 114 determines that a connection to an external device has started ("YES" in Step S13), the communication unit 114 identifies the type of the external device (Step S14). The communication unit 114 identifies the type of the external device based on information received from the connected external device. For example, when the external device is connected via the Bluetooth 132 as the communication device 130, the communication unit 114 identifies the type of the external device by identifying a profile based on the information received from the external device. The type of the external device is, for example, a classification, such as smartphone, PC, or headphone.

Next, the communication unit 114 sets the usability based on the type of the external device (Step S15). Depending on the type of the external device, the input and output path to be used may be uniquely specified. In this case, the type of the external device and the specific input and output path are associated with each other to be stored in advance in an area (not shown) of the storage unit 120. The communication unit 114 updates the input and output path usage management DB 124A by referring to the relevant area by using the type of the external device identified in Step S14, and sets the associated specific input and output path to be a usable input and output path and the other input and output paths to be unusable input and output paths. When the type of the identified external device does not identify the input and output path, the communication unit 114 advances the processing to Step S16 without performing any processing in particular.

Next, the input and output path assignment unit 115 determines whether or not there is an application to be started (Step S16). Specifically, the input and output path assignment unit 115 makes an inquiry to the operation management unit 112, and when the existence of an application for which a processing request has been made is detected, determines that there is an application to be started.

Information for identifying the application is included in the processing request. The application identified by the processing request may be an application stored in the storage unit 143 of the terminal device 102, or may be an application stored in the application storage unit 125 of the terminal connection device 100.

In the following description, the application detected in Step S16, which is included in the processing request, is referred to as an "input application". When there is an input application, the input and output path assignment unit 115 identifies the application ID of the input application in Step S16.

When the input and output path assignment unit 115 does not determine that there is an application to be started ("NO" in Step S16), the input and output path as unit 115 returns the processing to Step S13.

When the input and output path assignment unit 115 determines that there is an application to be started ("YES" in Step S16), the input and output path assignment unit 115 executes application start processing (Step S17). The application start processing is described later. In this processing, when a predetermined condition is satisfied, the input application is assigned to the input and output path for execution, and the input application is executed.

Next, the input and output path assignment unit 115 registers in the input and output path state storage unit 124 information on the input and output path assigned to the started application (Step S18). The input and output path assignment unit 115 registers in the input and output path usage management DB 124A the input and output path assigned to the application started in Step S17, the application ID of the started application, the application type, and information indicating the usability identified in Step S11.

Further, the input and output path assignment unit 115 generates the application type priority management DB 122A by using the application type of the started application and the priority 121Ad relating to the relevant application type in the input and output control setting DB 121A.

When an application is not to be started in Step S17, in this processing, information is not registered in the input and output path state storage unit 124 or the application type priority storage unit 122. The input and output path assignment unit 115 then returns the processing to Step S13.

In Step S18, after the information has been registered in the input and output path state storage unit 124, when an application processing request is newly detected by the input and output path assignment unit 115, the processing from Step S16 to Step S18 is repeated.

Figure 8:
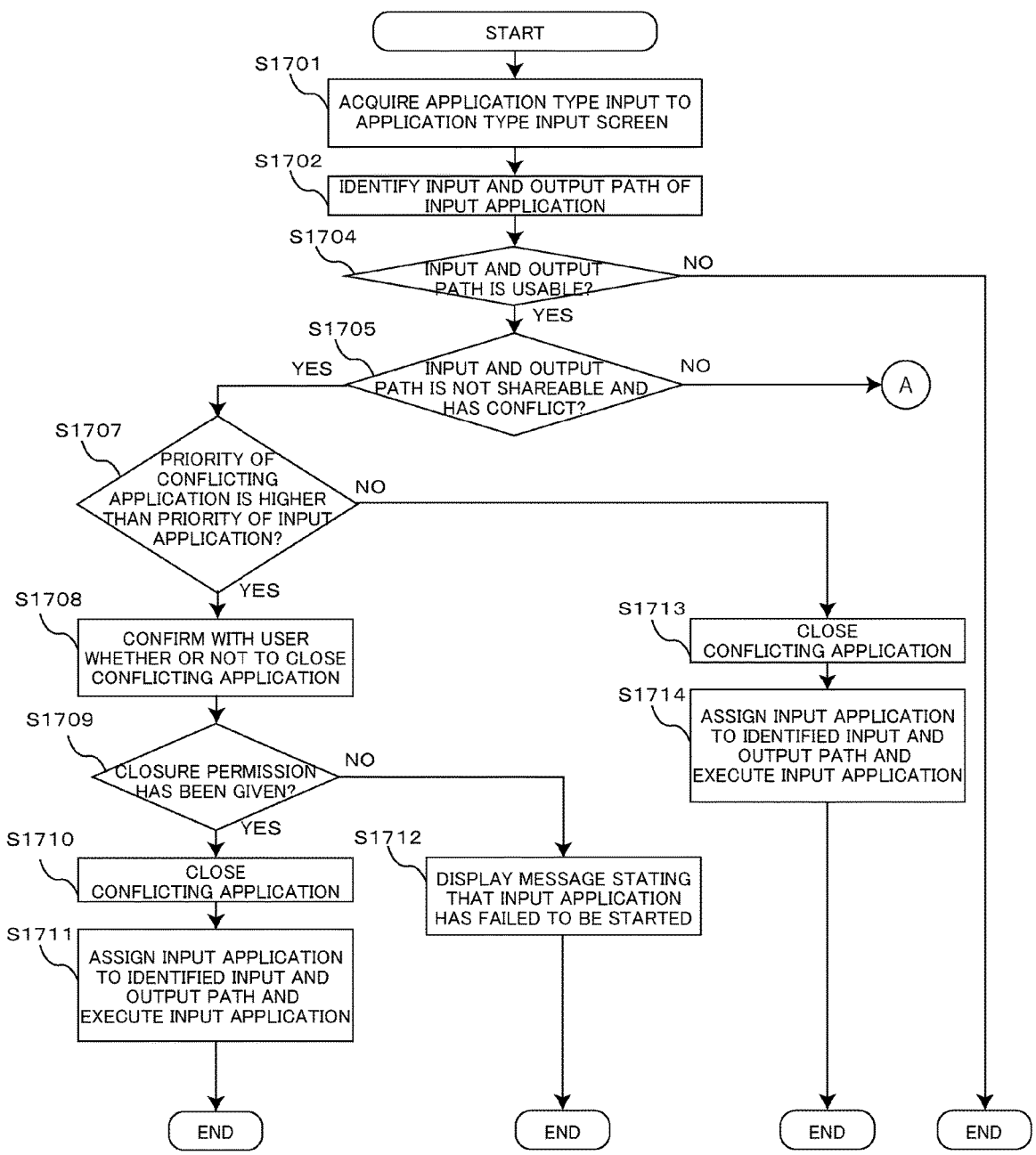
FIG. 8 is a flowchart for illustrating a flow of application start processing (Part 1).

FIG. 8 is a flowchart for illustrating a flow of application start processing (Part 1). This processing is a more detailed description of the processing performed in Step S17 of the input and output path assignment processing illustrated in FIG. 7.

First, the input and output path assignment unit 115 acquires the application type input on an application type input screen 1220 (Step S1701). Specifically, when the application type input screen 1220 is displayed on the display device by the display management unit 111, and input of the application type on the application type input screen 1220 is received by the operation management unit 112, the input and output path assignment unit 115 acquires the input application type.

FIG. 10 are views for illustrating an example of the application type input screen 1220 and an example of an application type confirmation screen 1230. FIG. 10(A) is an illustration of an example of the application type input screen 1220, and FIG. 10(B) is an illustration of an example of the application type confirmation screen 1230. The application type input screen 1220 is a screen configured to selectably display the application types included in the application type 121Aa of the input and output control setting DB 121A. The application type input screen 1220 includes an application type input area 1221 and application type buttons 1222 to 1225. The application type input screen 1220 may also be configured to receive input of the application type by receiving a direct input of a character string representing the application type. The display management unit 111 is configured to switch, when the application type has been input on the application type input screen 1220, the display screen to the application type confirmation screen 1230.

The application type confirmation screen 1230 includes a message display area 1231. A character string representing the application type input on the application type input screen 1220 is displayed in the message display area 1231.

Returning to the description of FIG. 8, next, the input and output path assignment unit 115 identifies the input and output path of the input application (Step S1702). Path information indicating an input and output path candidate based on the application type is stored in an area (not shown) of the storage unit 120.

FIG. 11 is a table for showing an outline of the path information. In the path information, the input and output path of the application is uniquely associated based on the application type. The input and output path assignment unit 115 is configured to refer to the path information by using the application type acquired in Step S1701, and to identify the associated input and output path.

Returning to the description of FIG. 8, next, the input and output path assignment unit 115 determines whether or not the input and output path identified in Step S1702 is usable (Step S1704). The input and output path assignment unit 115 refers to the input and output path usage management DB 124A by using the information indicating the input and output path identified in Step S1702, and determines whether or not the usability 124Ab is information indicating that the input and output path is usable.

When the input and output path assignment unit 115 does not determine that the identified input and output path is usable ("NO" in Step S1704), the input and output path assignment unit 115 finishes the processing of this flowchart. Next, the processing is advanced to Step S18 illustrated in FIG. 7.

When the input and output path assignment unit 115 determines that the identified input and output path is usable ("YES" in Step S1704), the input and output path assignment unit 115 determines whether or not the input and output path identified in Step S1702 is not shareable and has a conflict (Step S1705). Specifically, the input and output path assignment unit 115 refers to the input and output path shareability setting DB 123A by using the information indicating the identified input and output path, and identifies whether or not the shareability 123Ab is set to not shareable.

Further, the input and output path assignment unit 115 refers to the application type 124Ad of the input and output path usage management DB 124A by using the information indicating the identified input and output path, and identifies whether or not there is another application using the relevant input and output path. The input and output path assignment unit 115 determines that the relevant input and output path has a conflict when there is another application using the relevant input and output path.

In the following description, when the input and output path has a conflict, the another application using the relevant input and output path is referred to as a "conflicting application". When there is a conflicting application, in Step S1704, the input and output path assignment unit 115 identifies the referred-to application type 124Ad as the application type of the conflicting application.

When the input and output path assignment unit 115 determines that the identified input and output path is not shareable and has a conflict ("YES" in Step S1705), the input and output path assignment unit 115 determines whether or not the priority of the conflicting application is higher than the priority of the input application (Step S1707). The input and output path assignment unit 115 refers to the input and output control setting DB 121A by using information indicating the application type of the conflicting application and information indicating the application type of the input application acquired in Step S1701, and identifies the priority 121Ad relating to each application type.

The input and output path assignment unit 115 determines whether or not the priority of the conflicting application is higher than the priority of the input application by comparing the priority corresponding to the type of the input application and the priority corresponding to the type of the conflicting application.

When the input and output path assignment unit 115 determines that the priority of the conflicting application is higher than the priority of the input application ("YES" in Step S1707), the input and output path assignment unit 115 confirms with the user whether or not to close the conflicting application (Step S1708). The input and output path assignment unit 115 notifies the display management unit 111 to display on the display device a display screen (not shown) configured to receive input of a selection of whether or not to close the conflicting application.

Next, the input and output path assignment unit 115 determines whether or not closure permission has been given (Step S1709). The input and output path assignment unit 115 determines whether or not closure permission has been given based on the input made on the screen displayed in Step S1708.

When the input and output path assignment unit 115 determines that closure permission has been given ("YES" in Step S1709), the input and output path assignment unit 115 closes the conflicting application (Step S1710).

Next, the input and output path assignment unit 115 assigns the input application to the input and output path identified in Step S1702, and executes the input application (Step S1711). Then, the input and output path assignment unit 115 finishes the processing of this flowchart. Next, the processing is advanced to Step S18 illustrated in FIG. 7.

The input and output path assignment unit 115 does not determine that closure permission has been given ("NO" in Step S1709), the input and output path assignment unit 115 displays a message stating that the input application has failed to be started (Step S1712). Then, the input and output path assignment unit 115 finishes the processing of this flowchart. Next, the processing is advanced to Step S18 illustrated in FIG. 7.

When the input and output path assignment unit 115 does not determine in Step S1707 that the priority of the conflicting application is higher than the priority of the input application ("NO" in Step S1707), the input and output path assignment unit 115 closes the conflicting application (Step S1713). When the application type of the input application matches the application type of the conflicting application, the priorities are identical, and hence the conflicting application is closed in this step.

Next, the input and output path assignment unit 115 assigns the input application to the input and output path identified in Step S1702, and executes the input application (Step S1714). Then, the input and output path assignment unit 115 finishes the processing of this flowchart. Next, the processing is advanced to Step S18 illustrated in FIG. 7.

Figure 9:
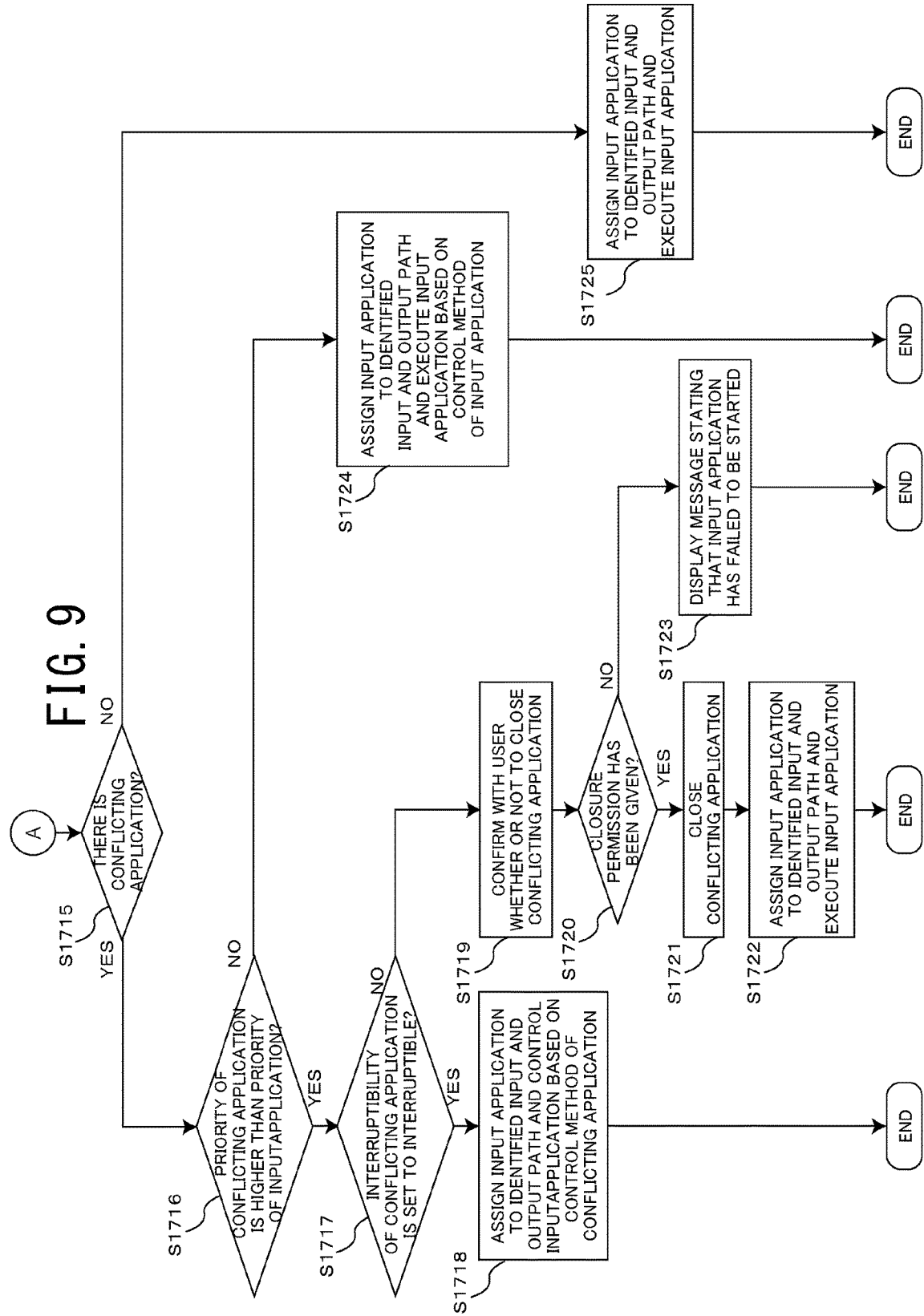
FIG. 9 is a flowchart for illustrating a flow of application start processing (Part 2).

When the input and output path assignment unit 115 does not determine in Step S1705 that the input and output path is not shareable and has a conflict ("NO" in Step S1705), the input and output path assignment unit 115 advances the processing to Step S1715 illustrated in FIG. 9.

FIG. 9 is a flowchart for illustrating a flow of application start processing (Part 2). The input and output path assignment unit 115 determines whether or not there is a conflicting application (Step S1715). The input and output path assignment unit 115 determines whether or not there is another application using the input and output path identified in Step S1702 by using the application type 124Ad referred to in Step S1705 described above. When it is determined that there is another application using the relevant input and output path, the input and output path assignment unit 115 determines that the input and output path has a conflict.

When the input and output path assignment unit 115 determines that there is a conflicting application ("YES" in Step S1715), the input and output path assignment unit 115 determines whether or not the priority of the conflicting application is higher than the priority of the input application (Step S1716). The processing performed in Step S1716 is the same as the processing of Step S1707, and hence a description thereof is omitted here.

When the input and output path assignment unit 115 determines that the priority of the conflicting application is higher than the priority of the input application ("YES" in Step S1716), the input and output path assignment unit 115 determines whether or not the interruptibility of the conflicting application is set to interruptible (Step S1717). Specifically, the input and output path assignment unit 115 refers to the input and output control setting DB 121A by using the application type of the conflicting application identified in Step S1704, and identifies the interruptibility 121Ac relating to the application type 121Aa. The input and output path assignment unit 115 determines whether or not the conflicting application is interruptible based on the information indicated by the identified interruptibility 121Ac.

When the input and output path assignment unit 115 determines that the interruptibility of the conflicting application is set to interruptible ("YES" in Step S1717), the input and output path assignment unit 115 assigns the identified input and output path to the input application, and controls the input application based on the control method of the conflicting application (Step S1718).

The input and output path is shareable, and the application type of a conflicting application having a high priority can be assigned, and hence the input and output path assignment unit 115 uses the identified input and output path for both the input application and the conflicting application. As a result, the input and output path assignment unit 115 assigns the input application to the input and output path identified in Step S1702.

The input and output path assignment unit 115 refers to the input and output control setting DB 121A by using the application type of the conflicting application having a high priority, and identifies the control method 121Ab relating to the application type 121Aa. The input and output path assignment unit 115 executes the input application based on the identified control method. Then, the input and output path assignment unit 115 finishes the processing of this flowchart. Next, the processing is advanced to Step S18 illustrated in FIG. 7.

For example, when the control method relating to the application type of the conflicting application is "silent interruption", the input and output path assignment unit 115 halts execution of the input application, and continues execution of the conflicting application. When execution of the conflicting application has finished, execution of the input application is restarted.

Further, for example, when the control method is "constant", the input and output path assignment unit 115 halts execution of the input application, and continues execution of the conflicting application. As a result, the input application is not started.

In addition, for example, when the control method is "MIX interrupt", the input and output path assignment unit 115 executes the input application together with execution of the conflicting application. For example, when the identified input and output path is "SPKR_1", the audio based on execution of the input application and the audio based on execution of the conflicting application are output in a superimposed manner from the relevant input and output path.

When the control method is "MIX interrupt", and the output path is a path using stereo-based output, the outputs may be superimposed by differentiating the sound image localization to be used for the output of the audio of the input application and the sound image localization to be used for the output of the audio of the conflicting application. Specifically, at one of the speakers, the acoustic pressure of the output of the input application is output at a higher level than the acoustic pressure of the output of the conflicting application. Further, at another of the speakers, the acoustic pressure of the output of the conflicting application is output at a higher level than the acoustic pressure of the output of the input application. As a result, the audio from the input application and the audio from the conflicting application are output at different sound image localizations, and hence confusion caused by the user hearing mixed audio can be prevented.

When the input and output path assignment unit 115 does not determine that the interruptibility of the conflicting application is set to interruptible ("NO" in Step S1717), the input and output path assignment unit 115 confirms with the user whether or not to close the conflicting application (Step S1719). The processing performed from Step S1719 to Step S1723 is the same as the processing performed from Step S1708 to Step S1712, and hence a description thereof is omitted here.

When the input and output path assignment unit 115 does not determine in Step S1716 that the priority of the conflicting application is higher than the priority of the input application ("NO" in Step S1716), the input and output path assignment unit 115 assigns the input application to the input and output path identified in Step S1702, and executes the input application based on the control method of the input application (Step S1724). Then, the input and output path assignment unit 115 finishes the processing of this flowchart. Next, the processing is advanced to Step S18 illustrated in FIG. 7.

When the input and output path assignment unit 115 does not determine in Step S1715 that there is a conflicting application ("NO" in Step S1715), the input and output path assignment unit 115 assigns the input application to the input and output path identified in Step S1702, and executes the input application (Step S1725). Then, the input and output path assignment unit 115 finishes the processing of this flowchart. Next, the processing is advanced to Step S18 illustrated in FIG. 7.

In the path information shown in FIG. 11, the application type and the input and output path correspond to each other on a one-to-one basis. However, a plurality of input and output paths may correspond to a single application type. In other words, an application relating to a single application type may use a plurality of input and output paths. In such a case, the processing illustrated in FIG. 7 and FIG. 8 is executed on each of the input and output paths corresponding to the application type of the input application.

For example, an application having "voice recognition" as an application type may be associated with "MIC-FRONT", "SPKR_1", "SPKR_2", "SPKR_3", and "SPKR-SUR" as the input and output paths. In this case, each of the relevant input and output paths is identified in order in Step S1702, and the relevant application is assigned to the input and output paths in the predetermined cases illustrated in FIG. 7 and FIG. 8.

In addition, an application having "voice recognition" as an application type is for performing processing based on the input audio, and hence such an application basically does not involve audio output. Despite this, "MIC-FRONT", "SPKR_1", "SPKR_2", and "SPKR_3", which are output paths used for audio output, are associated with the path information in order to prevent audio from being output from those output paths. The reason for this is that when audio is output from another application or the relevant application by using the relevant input and output path, the accuracy of the processing involving audio input decreases. In order to prevent this, an output path may be assigned even to application types that do not involve audio output, as in this embodiment.

Further, in this embodiment, in Step S1701 of FIG. 8, when an input application to be started is detected, the application type input screen 1220 is displayed. However, the application type input screen 1220 may also be displayed at the point when, in Step S13, a connection to an external device has been detected. In this case, when the communication unit 114 detects a connection to an external device, the communication unit 114 notifies the display management unit 111 of the connection. The display management unit 111 displays the application type input screen 1220 on the display device based on the notification.

According to this embodiment, even when a conflict occurs in an input and output path, an application can be assigned to the input and output path based on priorities determined in advance. Further, depending on the application type, another application and the input application may share the input and output path. Even in such a case, the input and output processing can be appropriately performed based on application types.

First Modified Example

Next, a first modified example of the present invention is described. In the above-mentioned embodiment, in the path information, one or a plurality of input and output paths is/are uniquely specified for an application type. In the first modified example, in the path information, one or a plurality of input and output paths is/are specified in advance as input and output path candidates for an application type, and the input and output path assignment unit 115 is configured to identify a candidate path, which is a candidate of the path to which an application is to be assigned, from among the relevant input and output paths. In the following description, points that are different from the above-mentioned embodiment are described, and a description of points that are overlapping is omitted.

Figure 12:
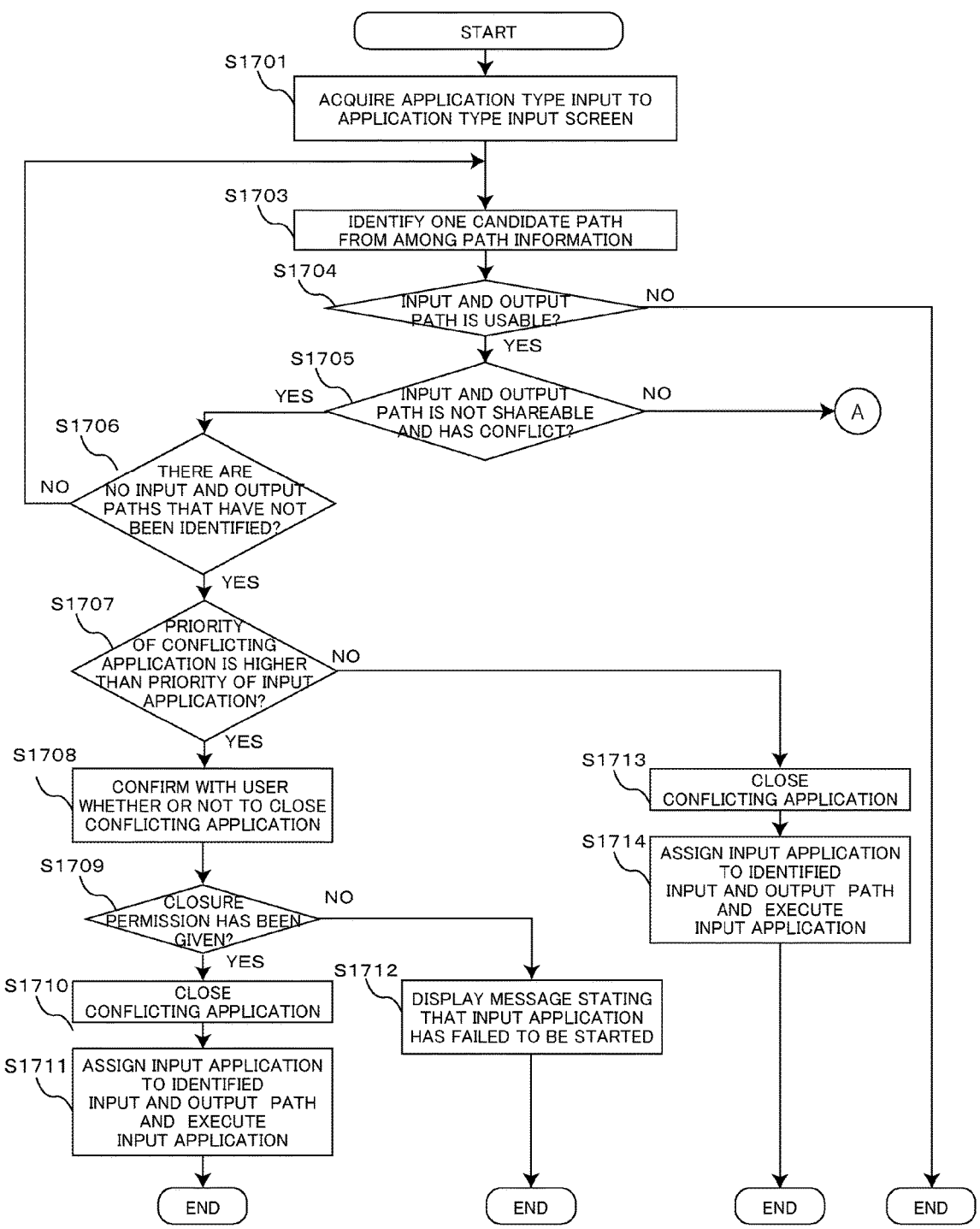
FIG. 12 is a flowchart for illustrating a flow of application start processing according to a first modified example of the present invention.

FIG. 12 is a flowchart for illustrating a flow of application start processing according to the first modified example. The processing of Step S1701 is the same as in the above-mentioned embodiment.

In the next step, the input and output path assignment unit 115 identifies one input and output path from among the path information as a candidate path (Step S1703). Similar to the above-mentioned embodiment, the input and output path assignment unit 115 refers to the path information by using the application type acquired in Step S1701. The input and output path assignment unit 115 identifies one candidate path from among the path information based on the application type.

FIG. 13 is a table for showing an example of the path information according to the first modified example. In the path information shown in FIG. 13, series information of one row including one or a plurality of input and output paths is associated with one application type. When executing the application relating to a predetermined application type, one input and output path is identified for one piece of series information. When a plurality of input and output paths are included in one piece of series information, the input and output path assignment unit 115 identifies the input and output paths in a predetermined order.

Returning to the description of FIG. 12, next, the input and output path assignment unit 115 advances the processing to Step S1704. The processing performed in Step S1704 and Step S1705 is the same as in the above-mentioned embodiment.

When the input and output path assignment unit 115 determines in Step S1705 that the input and output path is not shareable and has a conflict ("YES" in Step S1705), the input and output path assignment unit 115 determines whether or not there are any input and output paths that have not been identified (Step S1706). The input and output path assignment unit 115 determines whether or not there are any input and output paths that have not yet been identified in Step S1703 as candidate paths from among the input and output paths relating to the application type identified in Step S1701.

When the input and output path assignment unit 115 determines that there are no input and output paths that have not been identified ("YES" in Step S1706), the input and output path assignment unit 115 advances the processing to Step S1707. The processing subsequent to Step S1707 is the same as that in the above-mentioned embodiment.

When the input and output path assignment unit 115 does not determine that there are no input and output paths that have not been identified ("NO" in Step S1706), the input and output path assignment unit 115 returns the processing to Step S1703. In Step S1703, an input and output path that has not yet been identified is identified as the next candidate path.

Similar to the above-mentioned embodiment, also in this modified example, an application may use a plurality of input and output paths. In this case, for example, in the path information, as many pieces of series information as the number of input and output paths used for execution of the application are associated with one application type. Each piece of series information has one or a plurality of input and output paths as a candidate. The terminal connection device 100 executes the application start processing illustrated in FIG. 12 and FIG. 9 on each piece of series information.

According to this modified example, in a case in which an application is executable by using any one input and output path from among a plurality of input and output paths, when a given input and output path is not shareable and has a conflict, another input and output path is identified as a candidate path. As a result, when there are a plurality of input and output paths capable of being used for executing the application, input and output of the application may be performed more flexibly by, for example, assigning the application to an input and output path that is shareable.

Second Modified Example

Next, a second modified example of the present invention is described. In the second modified example, a case is described in which a change to the type of the application being executed is received from the terminal device 102. In the following description, points that are different from the above-mentioned embodiment are described, and a description of points that are overlapping is omitted.

Figure 14:
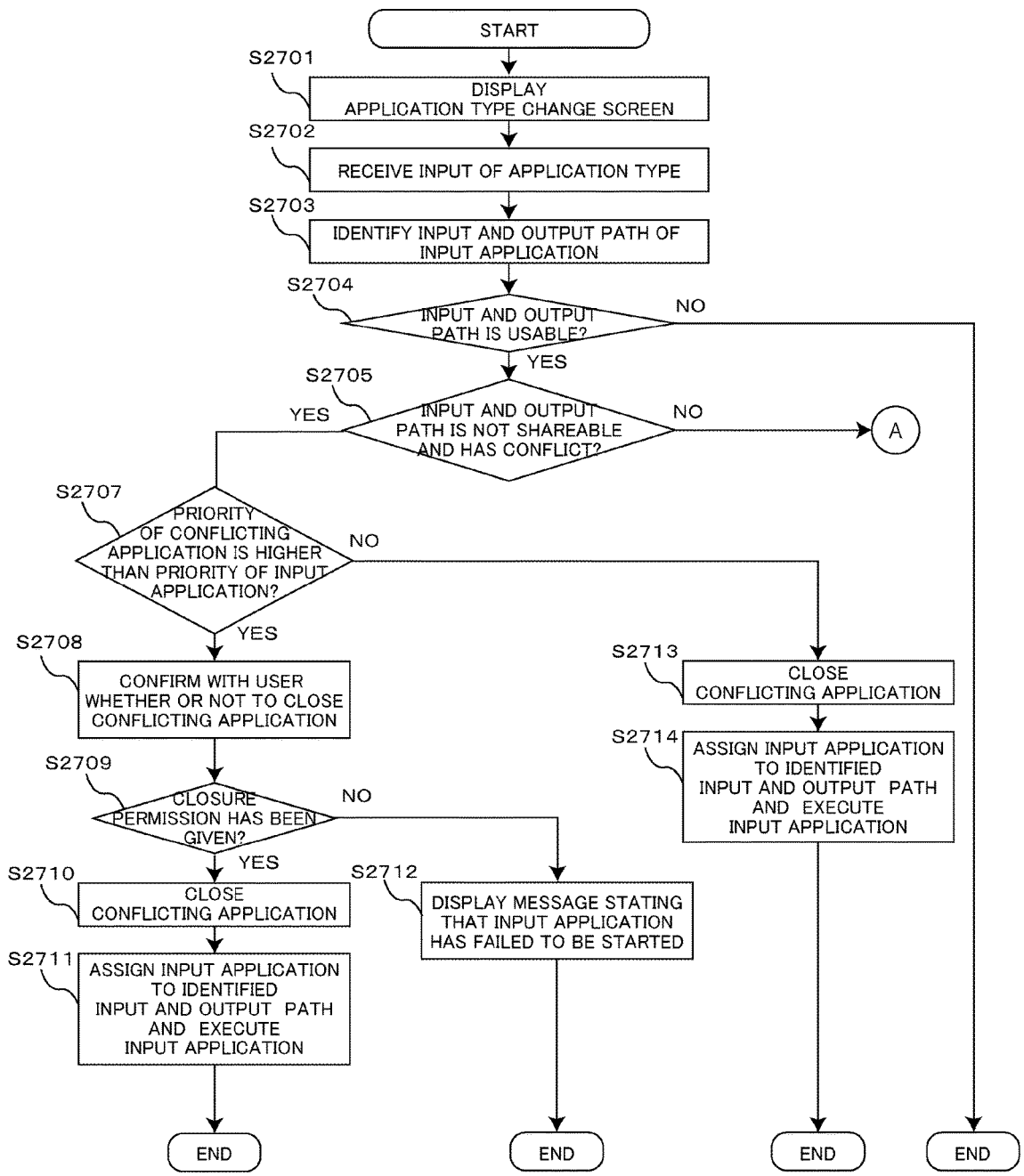
FIG. 14 is a flowchart for illustrating a flow of type change processing according to a second modified example of the present invention.

FIG. 14 is a flowchart for illustrating a flow of type change processing according to the second modified example. In this flowchart, processing is started when the terminal connection device 100 or the terminal device 102 receives, during execution of an application in the terminal device 102, an instruction to change the type of the relevant application.

First, the input and output path assignment unit 115 causes the display management unit 111 to display an application type change screen 1240 (Step S2701). The operation management unit 112 notifies the input and output path assignment unit 115 when the operation management unit 112 receives a type change instruction. The input and output path assignment unit 115 causes the display management unit 111 to output the application type change screen 1240 via the display device.

Figure 15:
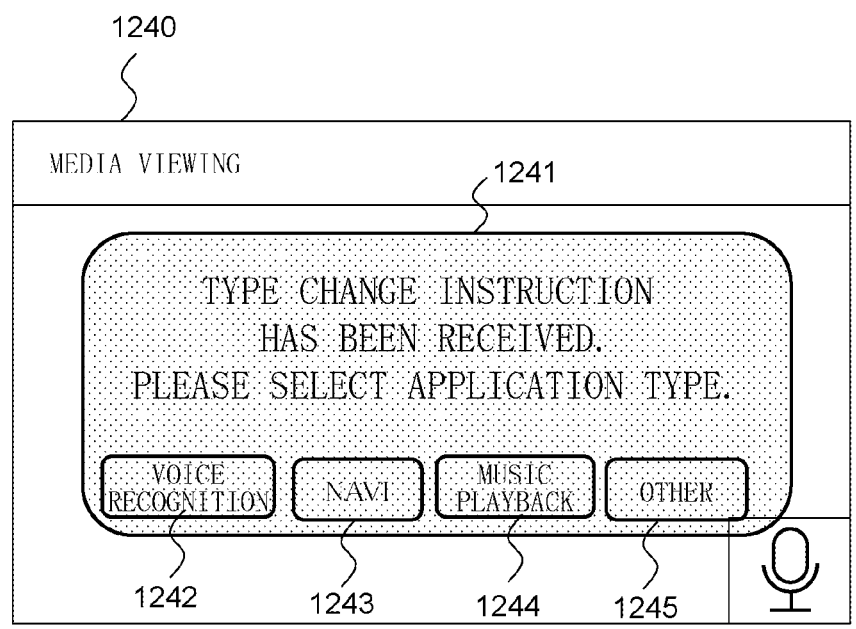
FIG. 15 is a view for illustrating an example of an application type change screen.

FIG. 15 is a view for illustrating an example of the application type change screen 1240. The application type change screen 1240 is a screen configured to selectably display application types. The application type change screen 1240 includes an application type input area 1241 and application type buttons 1242 to 1245. The point that the application type change screen 1240 may also be configured to receive a change to the application type based on input of a character string is the same as for input to the application type input screen 1220. When an application type has been input on the application type change screen 1240, the display screen switches to an application type confirmation screen. The application type confirmation screen is the same as the screen illustrated in FIG. 10(B).

Returning to the description of FIG. 14, next, the input and output path assignment unit 115 receives the input of the application type on the application type change screen 1240 (Step S2702).

Next, the input and output path assignment unit 115 advances the processing to Step S2703. The processing performed from Step S2703 to Step S2714, and the processing performed when the determination result in Step S2705 is "NO", are the same as the processing performed from Step S1702 to Step S1714 illustrated in FIG. 8 and the processing illustrated in the flowchart of FIG. 9, and hence a description thereof is omitted here.

According to this modified example, through receiving a change to the application type when, for example, it is desired during execution of an application that processing be performed by using another input and output path, the application can be assigned to an input and output path in accordance with the intentions of the user. As a result, applications can be flexibly assigned to the input and output paths in accordance with the intentions of the user.

Third Modified Example

Next, a third modified example of the present invention is described. In the above-mentioned embodiment, the application type input screen 1220 is displayed in order to acquire an application type, and the application type is acquired based on the information input on the screen. In this modified example, information for identifying the application type is included in an application processing request transmitted from the terminal device 102. The terminal connection device 100 is configured to automatically identify the application type by referring to the processing request acquired from the terminal device 102. In the following description, a description of the points that overlap the above-mentioned embodiment is omitted.

Figure 16:
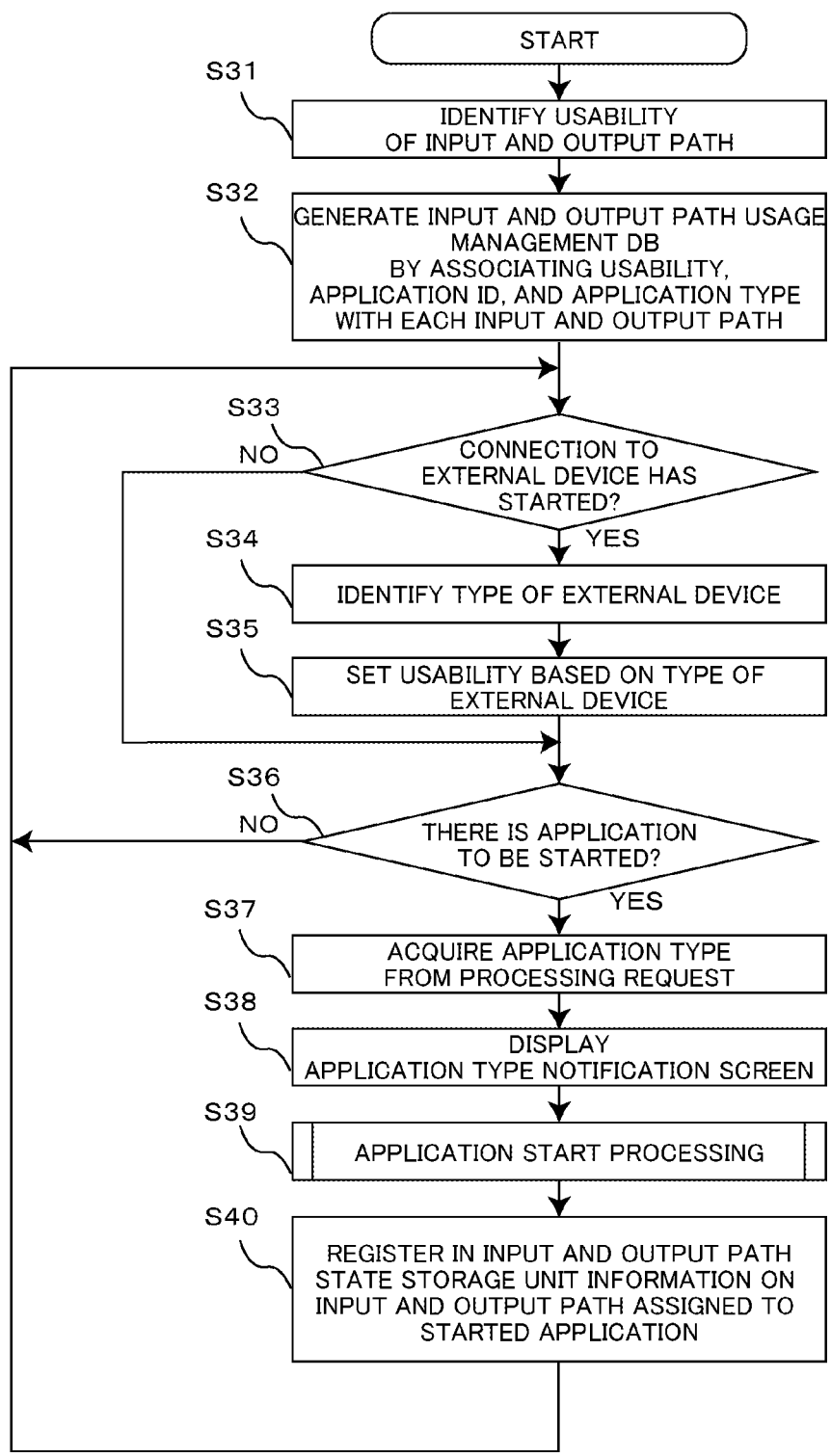
FIG. 16 is a flowchart for illustrating a flow of input and output path assignment processing according to a third modified example of the present invention.

FIG. 16 is a flowchart for illustrating a flow of input and output path assignment processing according to the third modified example.

First, the input and output path assignment unit 115 identifies the usability of the input and output paths (Step S31). The processing performed from Step S31 to Step S36 is the same as the processing performed from Step S11 to Step S16.

Next, the input and output path assignment unit 115 analyzes the processing request, and acquires the application type (Step S37).

Next, the input and output path assignment unit 115 displays an application type notification screen 1250 via the display management unit 111 (Step S38). The application type notification screen 1250 is a display screen for notifying the user of the application type acquired from the terminal device 102.

Figure 17:
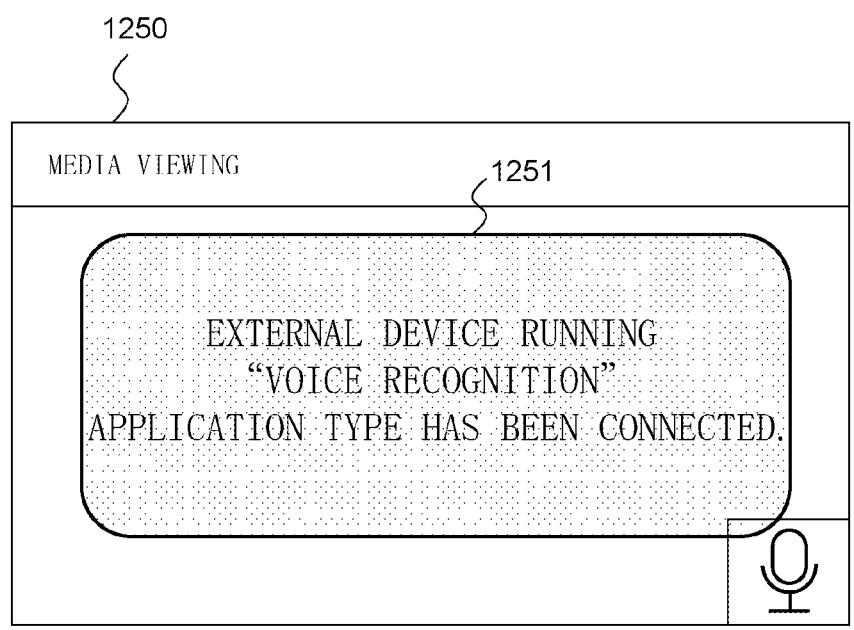
FIG. 17 is a view for illustrating an example of an application type notification screen.

FIG. 17 is a diagram for illustrating an example of the application type notification screen 1250. The application type notification screen 1250 includes a message display area 1251. A character string representing the application type acquired in Step S37 is displayed in the message display area 1251.

Returning the description to FIG. 16, the subsequent processing performed in Step S39 and Step S40 is the same as the processing performed in Step S17 and Step S18 illustrated in FIG. 7 described above, and hence a description thereof is omitted here.

Note that, in Step S40 of this modified example, the point that information on the started application is registered in the input and output path state storage unit 124, and then when an application processing request is newly detected, the processing from Step S36 to Step S40 is repeated, is the same as in the above-mentioned embodiment. During that processing, the application type of the application for which a processing request has been newly received is automatically acquired in Step S37.

Further, in this modified example, the input and output path assignment unit 115 may be configured to acquire the application type by asking the terminal device 102 for the application type via the communication unit 114, and receiving a response including information for identifying the application type. As a result, the work required for receiving input of the application type from the user may be omitted, thereby improving efficiency.

The respective embodiments and modification examples according to the present invention have been described above, but the present invention is not limited to examples of the above-mentioned embodiments, and includes various modification examples. For example, the examples of the above-mentioned embodiments are described in detail for a better understanding of the present invention, and the present invention is not limited to a configuration including all the components described above. Further, a part of the configuration of an example of a given embodiment can be replaced by the configuration of another example. Further, the configuration of another example can also be added to the configuration of an example of a given embodiment. Further, another configuration can be added to, be deleted from, or replace a part of the configuration of an example of each of the embodiments. Further, in regard to each of the above-mentioned configurations, functions, processing units, processing means, and the like, a part or entirety thereof may be implemented by hardware, for example, by being designed as an integrated circuit. Further, the accompanying drawings include control lines and information lines that are assumed to be necessary for the sake of description, but not all thereof are illustrated. It may also be considered that almost all the configurations are connected to one another.

Further, the above-mentioned functional configuration of the above-mentioned processing information execution system 10 is classified in accordance with main processing contents in order to facilitate the understanding. The present invention is not limited to how the components are classified or the names of the components. The configuration of the processing information execution system 10 can also be classified into more components in accordance with the processing contents. Further, the configuration of the processing information execution system 10 can also be classified so that one component executes more kinds of processing.

REFERENCE SIGNS LIST

10: processing information execution system, 11: arithmetic unit, 12: memory, 13: external storage device, 14:

output device, 15: input device, 100: terminal connection device, 101: vehicle, 102: terminal device, 103: server, 110: control unit, 111: display management unit, 112: operation management unit, 113: audio management unit, 114: communication unit, 115: input and output path assignment unit, 120: storage unit, 121: input and output control setting storage unit, 121A: input and output control setting DB, 122: application type priority storage unit, 122A: application type priority management DB, 123: input and output path shareability setting storage unit, 123A: input and output path shareability setting DB, 124: input and output path state storage unit, 124A: input and output path usage management DB, 125: application storage unit, 130: communication device, 131: HDMI, 132: Bluetooth, 133: USB, 134: wireless LAN, 141: control unit, 142: relay unit, 143: storage unit, 1220: application type input screen, 1221: application type input area, 1222: application type button, 1223: application type button, 1224: application type button, 1225: application type button, 1230: application type confirmation screen, 1231: message display area, 1240: application type change screen, 1241: application type input area, 1242: application type button, 1243: application type button, 1244: application type button, 1245: application type button, 1250: application type notification screen, 1251: message display area

The invention claimed is:

1. A terminal connection device, comprising:
a memory that stores a priority based on a type of processing information for performing input or output of information; and
a processor operatively coupled with the memory that includes:
  a communication device that receives from another device a processing request in which the processing information is identified; and
  an input and output path assignment circuitry operatively couple with the communication device that acquires, when the communication device has received the processing request, the type of the processing information identified in the processing request, to identify, by using an external processing information priority, which is a priority based on the type, and a candidate of an usable input and output path for each piece of the processing information, the input and output path for executing the processing information relating to the processing request, and to assign the processing information to the identified input and output path, and
wherein the input and output path assignment circuitry:
  identifies as the candidate path one of the input and output paths identified as being usable by the processing information relating to the processing request; and
  assigns to the candidate path at least one of the processing information relating to the processing request and the processing information being executed, by using a priority of the processing information being executed, which is the priority based on the type of the processing information that is executing processing by using the candidate path, and the external processing information priority.

2. A terminal connection device according to claim 1,
wherein the memory stores shareability information indicating whether or not each input and output path is shareable, and
wherein the input and output path assignment circuitry assigns, when the candidate path is not shareable, to the candidate path any one of the processing information relating to the processing request and the processing information being executed based on the priorities.

3. A terminal connection device according to claim 2, wherein the input and output path assignment circuitry assigns, when a predetermined candidate path from among a plurality of candidates of the input and output paths usable for each piece of the processing information is not shareable, processing information relating to the processing request to another input and output path from among the plurality of candidates of the input and output paths.

4. A terminal connection device according to claim 1,
wherein the memory stores a control method for the processing information based on the type, and
wherein the input and output path assignment circuitry controls, when the candidate path is shareable, the processing information relating to the processing request assigned to the candidate path and the processing information being executed, based on the control method associated with the processing information of the type having a higher priority.

5. A terminal connection device according to claim 4, wherein the input and output path assignment circuitry superimposes, when the control method associated with the processing information of the type having a higher priority is a predetermined first method, output based on the processing information relating to the processing request and output based on the processing information being executed.

6. A terminal connection device according to claim 5, wherein the input and output path assignment circuitry superimposes the output based on the processing information relating to the processing request and the output based on the processing information being executed by outputting both outputs at different sound image localizations.

7. A terminal connection device according to claim 4, wherein the input and output path assignment circuitry assigns, when the control method associated with the processing information of the type having a higher priority is a predetermined second method, an output path to the processing information that does not involve output.

8. A terminal connection device according to claim 1, wherein the processor further comprises a display management circuitry that displays, when the communication device has received the processing request, a type input screen configured to receive input of the type of the processing information identified in the processing request,
wherein the input and output path assignment circuitry acquires the type input on the type input screen.

9. A terminal connection device according to claim 1,
wherein the communication device receives from the another device the processing request including information for identifying the type of the processing information, and
wherein the input and output path assignment circuitry refers to the processing request and to acquire the type of the processing information.

10. A terminal connection device according to claim 1, wherein the processor further comprises a display management circuitry that displays, when the communication device detects a connection to the another device, a type input screen configured to receive input of the type of the processing information, wherein the communication device detects a connection to the another device, and wherein the input and output path assignment circuitry acquires the type input on the type input screen.

11. A processing information execution system, comprising:

a terminal connection device; and a terminal device connected to the terminal connection device via a network, the terminal device comprising a relay that transmits to the terminal connection device a processing request in which processing information is identified, the terminal connection device comprising:

a processor operatively coupled with the relay, the processor including:

a communication device that receives the processing request; and an input and output path assignment circuitry that acquires, when the communication unit has received the processing request, a type of the processing information identified in the processing request, to identify, by using an external processing information priority, which is a priority based on the type, and a candidate of an usable input and output path for each piece of the processing information, the input and output path for executing the processing information relating to the processing request, and to assign the processing information to the identified input and output path, and wherein the input and output path assignment circuitry:

identifies as the candidate path one of the input and output paths identified as being usable by the processing information relating to the processing request; and assigns to the candidate path at least one of the processing information relating to the processing request and the processing information being executed, by using a priority of the processing information being executed, which is the priority based on the type of the processing information that is executing processing by using the candidate path, and the external processing information priority.

12. A processing information execution method comprising:

receiving from another device a processing request in which processing information for performing input or output of information is identified;

acquiring, when the processing request is received, a type of the processing information identified in the processing request, identifying, by using an external processing information priority, which is a priority based on the type, and a candidate of an usable input and output path for each piece of the processing information, the input and output path for executing the processing information relating to the processing request, and assigning the processing information to the identified input and output path;

identifying as the candidate path one of the input and output paths identified as being usable by the processing information relating to the processing request; and assigning to the candidate path at least one of the processing information relating to the processing request and the processing information being executed, by using a priority of the processing information being executed, which is the priority based on the type of the processing information that is executing processing by using the candidate path, and the external processing information priority.

* * * * *